United States Patent
Kiyono et al.

(10) Patent No.: US 9,327,655 B2
(45) Date of Patent: May 3, 2016

(54) IMAGE CAPTURING APPARATUS FOR CLOSE AND DISTANT OBJECTS

(71) Applicant: DENSO CORPORATION, Kariya, Aichi-pref. (JP)

(72) Inventors: Mitsuhiro Kiyono, Obu (JP); Ryoichi Sugawara, Nagoya (JP); Ko Oyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 300 days.

(21) Appl. No.: 14/045,339

(22) Filed: Oct. 3, 2013

(65) Prior Publication Data

US 2014/0104425 A1   Apr. 17, 2014

(30) Foreign Application Priority Data

Oct. 16, 2012 (JP) ................. 2012-228927

(51) Int. Cl.
| | | |
|---|---|---|
| *H04N 7/18* | (2006.01) | |
| *B60R 11/04* | (2006.01) | |
| *G02B 13/00* | (2006.01) | |
| *B60R 16/02* | (2006.01) | |
| *G02B 27/00* | (2006.01) | |

(52) U.S. Cl.
CPC ............. *B60R 11/04* (2013.01); *B60R 16/02* (2013.01); *G02B 13/001* (2013.01); *G02B 27/0075* (2013.01)

(58) Field of Classification Search
CPC .............................. A01B 12/006; B60R 11/04
USPC ........................................................ 348/148
See application file for complete search history.

(56) References Cited

U.S. PATENT DOCUMENTS

| | | | |
|---|---|---|---|
| 2007/0047948 A1 | 3/2007 | Tanida | |
| 2008/0111909 A1* | 5/2008 | Miyajima | ............ G02B 15/173 348/335 |
| 2010/0277935 A1* | 11/2010 | Endo | .................... B60Q 1/0023 362/466 |
| 2011/0216197 A1 | 9/2011 | Mulin et al. | |

FOREIGN PATENT DOCUMENTS

| | | |
|---|---|---|
| JP | 2006-184844 A | 7/2006 |
| JP | 2010-249965 A | 11/2010 |

OTHER PUBLICATIONS

Office Action mailed Aug. 25, 2015 in the corresponding JP application No. 2012-228927 (with English Translation).

* cited by examiner

*Primary Examiner* — Richard Torrente
(74) *Attorney, Agent, or Firm* — Posz Law Group, PLC

(57) ABSTRACT

An image capturing apparatus includes an optical system and an image sensor to capture images of a close object and distant object. The optical system includes a convex lens as a first optical member and a glass plate as a second optical member with a refractive index higher than that of air. The second optical member is located in between the first optical member and a first image point at which a real image of the close object is formed, to absorb a positional difference between the first image point and a second image point at which a real image of the distant object is formed. The image sensor includes multiple light reception elements to generate a single picture frame that contains simultaneously a real image of the close object and a real image of the distant object.

20 Claims, 6 Drawing Sheets

IMAGE CAPTURING APPARATUS FOR CLOSE AND DISTANT OBJECTS

CROSS REFERENCE TO RELATED APPLICATION

The present application is based on Japanese Patent Application No. 2012-228927 filed on Oct. 16, 2012, the disclosure of which is incorporated herein by reference.

TECHNICAL FIELD

The present disclosure relates to an image capturing apparatus used for a driving support control system.

BACKGROUND ART

Patent Literature 1: JP 2007-060158 A (US 2007/047948 A1)

There is conventionally known an in-vehicle driving support control system, which includes an image capturing apparatus to capture an image, and a control apparatus to perform a driving support control which assists travel of a vehicle based on the surrounding state of the vehicle detected from the image captured by the image capturing apparatus.

The driving support control includes an automatic wiper control, an adaptive cruise control, and a pre-crash safety control, for instance. The automatic wiper control captures an image of the windshield, detects raindrops based on the captured image, determines that the surrounding state of the vehicle is a state where it is raining, and actuates the wiper automatically. The adaptive cruise control captures an image of an area over the road the vehicle travels, detects a traveling-ahead vehicle based on the captured image, determines that the surrounding state of the vehicle is a state where a traveling-ahead vehicle is present, and controls the behavior of the vehicle to follow the traveling-ahead vehicle. The pre-crash safety control captures an image of an area over a road the vehicle travels, detects an object on the road based on the captured image, determines that the surrounding state of the vehicle is a state where a crash-unavoidable object is present, and applies a braking force to the vehicle or winds the seat belt up.

Such a driving support control system requires an image capturing apparatus which detects the surrounding state of the vehicle accurately to permit a single captured image (i.e., a picture) to represent simultaneously different objects having respective distances from the vehicle. The different objects having respective different distances from the vehicle exemplified by the windshield of the vehicle and a traveling-ahead vehicle or unavoidable object on the road the vehicle travels.

Patent Literature 1 proposes an image capturing apparatus (i.e., camera module) to achieve the above requirement. The image capturing apparatus includes a first lens having a specified first focal length, a second lens having a second focal length that is longer than the first focal length, an image sensor to focus incident light to generate a picture, a second mirror to reflect the light which passed through the second lens, and
a first mirror to reflect the light reflected by the second mirror such that the reflected light falls on the image sensor while transmitting the light having passed through the first mirror such that the transmitted light falls on the image sensor.

In general, vehicles are required to provide a larger space of occupant compartment or to secure the visibility in the heading direction; thus, the image capturing apparatus arranged in the occupant compartment is required to have a smaller size.

However, the image capturing apparatus in Patent Literature 1, which includes two lenses, two mirrors, and a image sensor, thus needs many components; this configuration is insufficient in making the size smaller.

That is, the image capturing apparatus in Patent Literature 1 does not enable at the same time (i) the generation of the captured image which clearly expresses simultaneously several objects having mutually different distances from the vehicle, and (ii) sufficient miniaturization of the image capturing apparatus itself.

SUMMARY

It is an object of the present disclosure to provide an image capturing apparatus which enables at the same time (i) generation of a captured image which clearly expresses simultaneously several objects having mutually different distances from the image capturing apparatus itself and (ii) sufficient miniaturization of the image capturing apparatus itself.

To achieve the above object, according to an aspect of the present disclosure, an image capturing apparatus is provided as including a first optical member, an image sensor, and a second optical member. The first optical member has a predetermined first focal point distance that is a distance to an image-side focal point in an image side. Herein, light rays, which come from an object side in parallel to an optical axis (Lr), converge at the image-side focal point in the image side. The first optical member separates along the optical axis from a first object and a second object in the object side by a first distance and a second distance, respectively; the second distance is longer than the first distance. The image sensor is disposed at a first image formation point where an image is formed by light rays coming from the first object and passing through the first optical member. The image sensor is along a plane orthogonal to the optical axis, the image sensor including a plurality of light reception elements in array along the plane, each light reception element outputting a reception signal proportional to an intensity of a received light. The image sensor generates a picture based on the reception signals. The second optical member has a refractive index higher than a refractive index of air. The second optical member is disposed in between the first optical member and the image sensor to refract light rays coming from the second object and passing through the first optical member. The second optical member thereby permits a second on-axis position to be approximate to a first on-axis position. Herein, the second on-axis position is a foot of perpendicular line to the optical axis from a second image formation point where an image is formed by light rays coming from the second object and passing through the first optical member and the second optical member; the first on-axis position is a foot of perpendicular line to the optical axis from the first image formation point.

Light rays, which come from the first object (i.e., close object or short-distance object) and pass through the first optical member, form an image at the first image formation point, at which the image sensor is disposed. Light rays, which come from the second object (i.e., distant object or long-distance object) and pass through the first optical member, form an image at the second image formation point, which is disposed short of the image sensor. That is, the distance between the first optical member and the second image formation point is shorter than the distance between the first optical member and the first image formation point. When the second optical member is provided as recited in the above configuration according to the aspect of the present disclosure, light rays, which come from the distant object and pass through both the first optical member and the second optical member, form an image at a different image formation point, which is extended from the first image formation point to approach to the image sensor. In other words, the different image formation point of the distant object is approximate to the first image formation point of the close object. Thereby, the second optical member permits the image sensor to generate a single picture frame that simultaneously expresses a clear image of the close object and a clear image of the distant object within a permissible bokeh.

The permissible bokeh corresponds to a permissible circle of confusion. As generally known, the depth of focus is defined as a range having a circle of confusion less than the permissible circle of confusion in the front side and the rear side of the ideal focus.

That is, the image capturing apparatus according to the aspect of the present disclosure permits the generation of a single picture simultaneously indicating two clear images of two different objects having mutually different distances (i.e., short distance and long distance), without using many optical components like in Patent Literature 1.

Further, the image capturing apparatus according to the aspect the present disclosure also permits the size of the image capturing apparatus itself to be smaller than that of Patent Literature 1.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Hereafter, description will be given to an embodiment of the present disclosure with reference to the drawings. A driving support control system 1 according to an embodiment of the present disclosure is mounted in a vehicle (also referred to as a host vehicle, see FIG. 2) to detect a surrounding state of the host vehicle V and perform a driving support control to assist a driver of the host vehicle V to drive safely.

Figure 1:
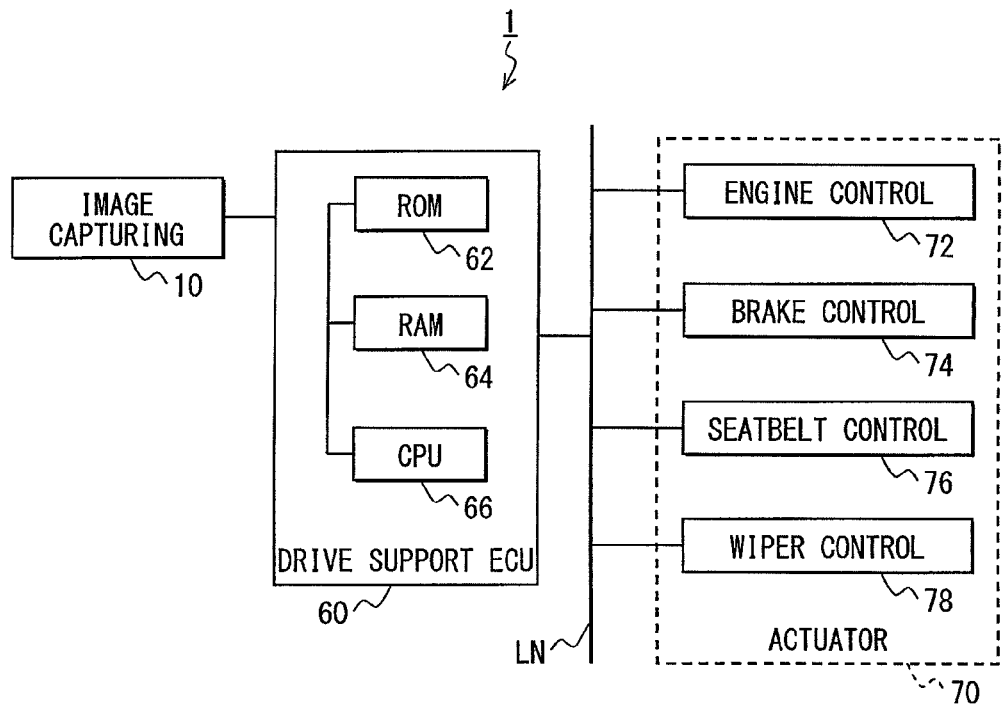
FIG. 1 is a block diagram illustrating an overall configuration of a driving support control system according to an embodiment of the present disclosure.
Figure 2:
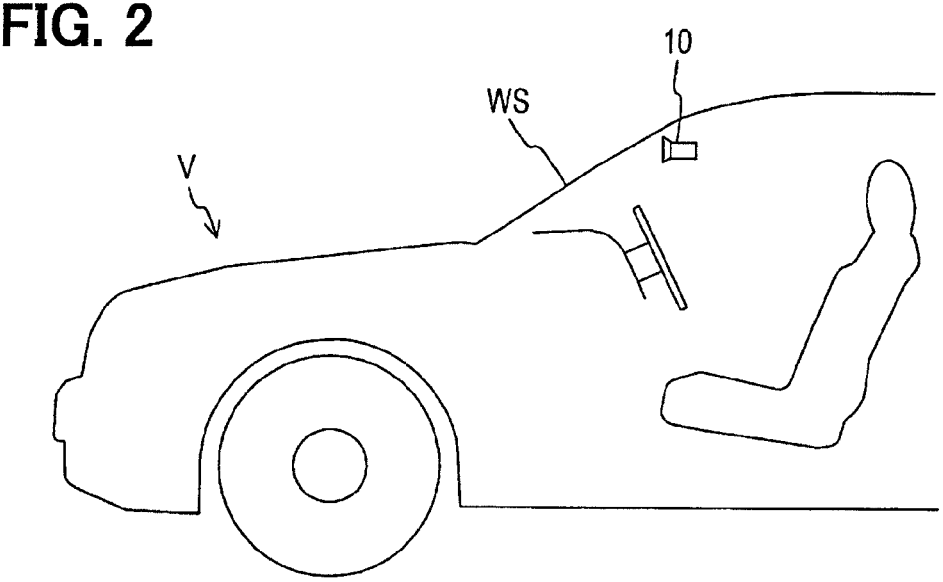
FIG. 2 is a diagram illustrating an arrangement position of an image capturing apparatus according to the embodiment.

With reference to FIG. 1, the driving support control system 1 includes an image capturing apparatus 10, a driving support electronic control unit (hereinafter, referred to as a driving support ECU) 60, and an actuator portion 70. The image capturing apparatus 10 generates a captured image or picture. The image capturing apparatus 10 is disposed inside of the vehicle compartment, thereby capturing an image of a forward surrounding state in a heading direction of the host vehicle V, as indicated in FIG. 2; the forward surrounding state includes a front windshield WS of the host vehicle V. The details of the image capturing apparatus 10 will be mentioned later.

As indicated in FIG. 1, the driving support ECU 60 is a well-known computer that contains a ROM 62 storing data and software programs constantly even if the power supply is disconnected; a RAM 64 storing temporarily data and software programs; and a CPU 66 executing a variety of processes according to programs stored in the ROM 62 or RAM 64.

The actuator portion 70 includes an engine control apparatus 72 which controls the engine of the host vehicle; a brake control apparatus 74 which controls the brake of the host vehicle; a seatbelt control apparatus 76 which controls the seatbelt of the host vehicle; and a wiper control apparatus 78 which controls the wiper of the host vehicle. The foregoing apparatuses 72, 74, 76, 78 are connected to the driving support ECU 60 via a communication bus LN.

The data communications performed via the communication bus LN may use CAN protocol ("Controller Area Network" protocol which Robert Bosch proposes), which is generally performed in in-vehicle networks.

In the present embodiment, the driving support control performed by the driving support control system 1 includes an automatic wiper control, an adaptive cruise control, and a pre-crash safety control, at least.

That is, when detecting that the surrounding state of the host vehicle V indicates a state where it is raining, the driving support ECU 60 performs an automatic wiper control which controls the wiper control apparatus 78 to drive the wiper of the host vehicle V. When raindrops which are attached to the front windshield are detected based on the image captured by the image capturing apparatus 10, the surrounding state of the host vehicle V may be determined to be a state where it is raining.

Further, when detecting that the surrounding state of the host vehicle V indicates a state where a front vehicle (also referred to as a traveling-ahead vehicle) is present ahead of the host vehicle, the driving support ECU 60 performs an adaptive cruise control which controls the engine control apparatus 72 and the brake control apparatus 74 to permit the host vehicle to follow the traveling-ahead vehicle. Here, the present embodiment uses a known technology to detect a traveling-ahead vehicle based on a captured image of a forward area over the road the host vehicle V is traveling.

Further, the driving support ECU 60 may detect that the surrounding state of the host vehicle V indicates a state where an object which the host vehicle V cannot avoid exists, based on a known technology based on a captured image of a forward area over the road the host vehicle V is traveling. In such a case, the driving support ECU 60 performs a pre-crash safety control which controls the host vehicle V to reduce a damage at the time of colliding with the object. The pre-crash safety control controls the brake control apparatus 74 and the seat belt control apparatus 76 so that the braking force is applied to the host vehicle V and the seat belt is winded up.

<Image Capturing Apparatus>

Figure 3:
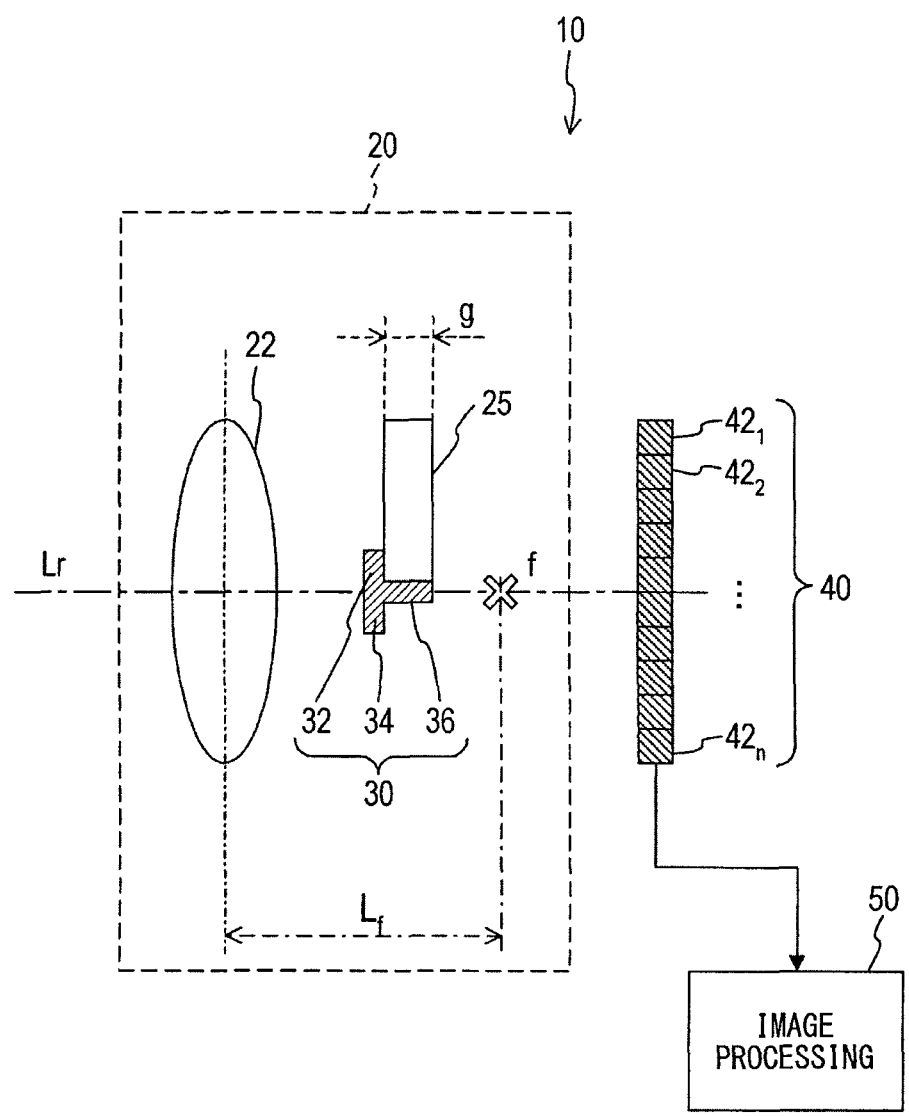
FIG. 3 is a diagram illustrating a schematic configuration of the image capturing apparatus.
Figure 6:
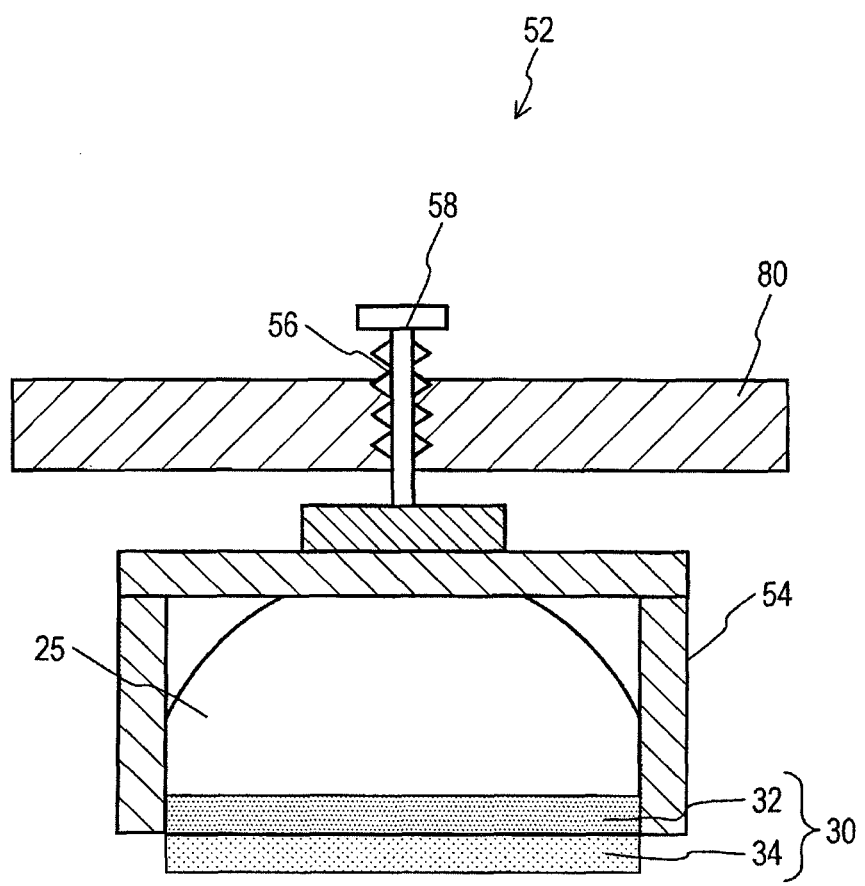
FIG. 6 is a diagram illustrating a schematic configuration of an adjustment device.

With reference to FIG. 3, the image capturing apparatus 10 includes an optical system 20, an image sensor 40, and an image processing apparatus 50; the image capturing apparatus 10 is contained in a housing 80 (refer to FIG. 6).

The optical system 20 refracts incident light which enters the optical system 20 itself to form an image. The optical system 20 includes a first optical member 22, a second optical member 25, a light reduction member 30, and an adjustment device 52 (refer to FIG. 6).

The image sensor 40 is a known one that includes a plurality of light reception elements 42, which output reception signals proportional to a luminous intensity of received light. In the present embodiment, the light reception elements 42 are arrayed by n rows×m columns on a plane orthogonal to an optical axis Lr of the first optical member 22. Here, "n" is an integer more than one; "m" is an integer more than one, for example.

The image sensor 40 is located in the image formation plane of the optical system 20 for taking or photographing an image projected on the image formation plane. The "image formation plane" is a plane which is orthogonal to the optical axis Lr of the first optical member 22, and a plane (image point) where a real image formed by the light from the first object is projected.

The image processing apparatus 50 includes mainly a known microcomputer containing at least a ROM, a RAM, and a CPU for performing an image process for a picture generated by the image sensor 40.

<Optical System>

The following will explain the detail of the optical system 20.

The first optical member 22 is a convex lens; the convex lens permits the light, which comes from an object existing at a position farther than an object-side focal point f, to converge at an image formation point (i.e., image point) so that a real image is formed. The focal point distance of the first optical member 22 is previously specified as a first focal point distance.

Such a first optical member 22 forms a real image with the light from a first object, which exists at a point (first distance) farther than an object-side focal point f1 with respect to the first optical member 22; the real image is formed at a first image formation point. A foot of perpendicular line from the first image formation point to the optical axis Lr is referred to as a first on-axis position. Furthermore, the first optical member 22 forms a real image with the light from a second object, which exists at a point (second distance) that is farther than the first object with respect to the first optical member 22; the real image is formed at a second image formation point. That is, the second distance of the second object is longer than the first distance of the first object. In other words, the second object may be referred to as a distant object or long-distance object; the first object may be referred to as a close object or short-distance object. A foot of perpendicular line from the second image formation point to the optical axis Lr is referred to as a second on-axis position. The distance from the optical member 22 to the first on-axis position is longer than the distance from the optical member 22 to the second on-axis position.

In the present embodiment, the first object is supposed to be an object that is attached on an outer surface of the windshield WS of the host vehicle V, such as a raindrop. Furthermore, in the present embodiment, the second object is supposed to be an object that exists in a forward area over the road the host vehicle V is traveling, such as a traveling-ahead vehicle or a falling object on the road.

The second optical member 25 is a plate-like member, which is made of glass and formed in a semicircular shape; the glass has a refractive index higher than the refractive index of the air. The second optical member 25 is located between (i) the first optical member 22 and (ii) the first image formation point at which a real image is formed by the first optical member 22 with the light from the first object. The second optical member 25 is arranged such that the chord passing through the circular center coincides with the bottom of the semi-circular second optical member 25 and is orthogonal to the optical axis Lr of the first optical member 22.

The second optical member 25 is provided to absorb a positional difference between (i) the first image formation point at which the real image due to the light from the first object is formed and (ii) the second image formation point at which the real image due to the light from the second object is formed.

Figure 4:
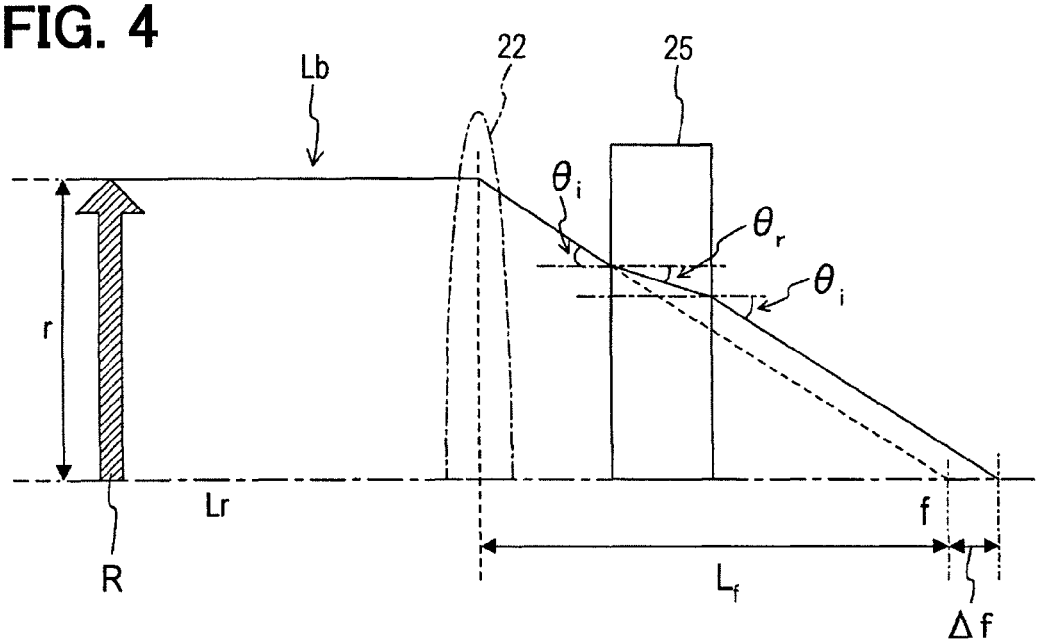
FIG. 4 is a diagram for explaining extension of a focal point distance due to a second optical member.

To be specific, with reference to FIG. 4, the object R serving as the second object is located in infinity further than the second distance; the light Lb from the object R is refracted by the first optical member 22 and enters the second optical member 25 at an angle θi. The light Lb (i.e. the light ray Lb) which entered the second optical member 25 is refracted due to the change of the medium at an angle of refraction θr to change the route, and then reaches a boundary face between (i) the second optical member 25 and (ii) the air. Furthermore, the light Lb reaches the boundary face at an incidence angle θr and exists to the air at an angle of refraction θi.

It is noted that the angles θi and θr are expressed with the following equations (1) and (2), respectively. The sign "r" in the equation (1) is the height from the optical axis Lr to one object point of the object R, and the sign "Lf" is the focal point distance of the first optical member 22. Here, the sign "n1" in the equation (2) is a refractive index of the air; the sign "n2" is a refractive index of the glass which is material of the second optical member 25.

$$\theta_i = \tan^{-1}\left(\frac{r}{L_f}\right) \quad (1)$$

$$\theta_r = \sin^{-1}\left(\frac{n_1}{n_2}\sin\theta_i\right) \quad (2)$$

The Light Lb is refracted due to the presence of the second optical member 25. Such refraction extends the image formation point (that is, second image formation point) at which the real image of the object R serving as the second object is formed, by the distance corresponding to the extended distance ΔLf. The image formation point may be also referred to as an image point. The lens thickness g (along the optical axis Lr) of the second optical member 25 is specified to permit the second image formation point to approach (be approximate) to the first image formation point at which the real image due to the light from the first object is formed.

To be specific, the lens thickness g of the second optical member 25 is specified according to the following equations (3) and (4).

$$\Delta f_1 = \frac{r - g\tan\theta_r}{\tan\theta_i} - (L_f - g) \quad (3)$$

$$g = \frac{(L_f + \Delta f_1)\tan\theta_i - r}{\tan\theta_i - \tan\theta_r} \quad (4)$$

Here, Δf1 in the equation (3) is a distance necessary for the second image formation point to be approximate to the first image formation point. The following refers to the distance Δf1 as a difference absorption distance Mi. To be specific, the difference absorption distance Δf1 is specified such that an image formed on an image formation plane by the light from the first object and an image formed on an image formation plane by the light from the second object are provided within a range where the two images are recognized as being clear. The phrase of "within a range where the two images are recognized as being clear" indicates a state where the two images formed by the optical system 20 are within a range of so-called permissible or acceptable bokeh, which corresponds to a permissible circle of confusion. As generally known, the depth of focus is defined as a range having a circle of confusion less than the permissible circle of confusion in the front side and the rear side of the ideal focus.

Figure 5:
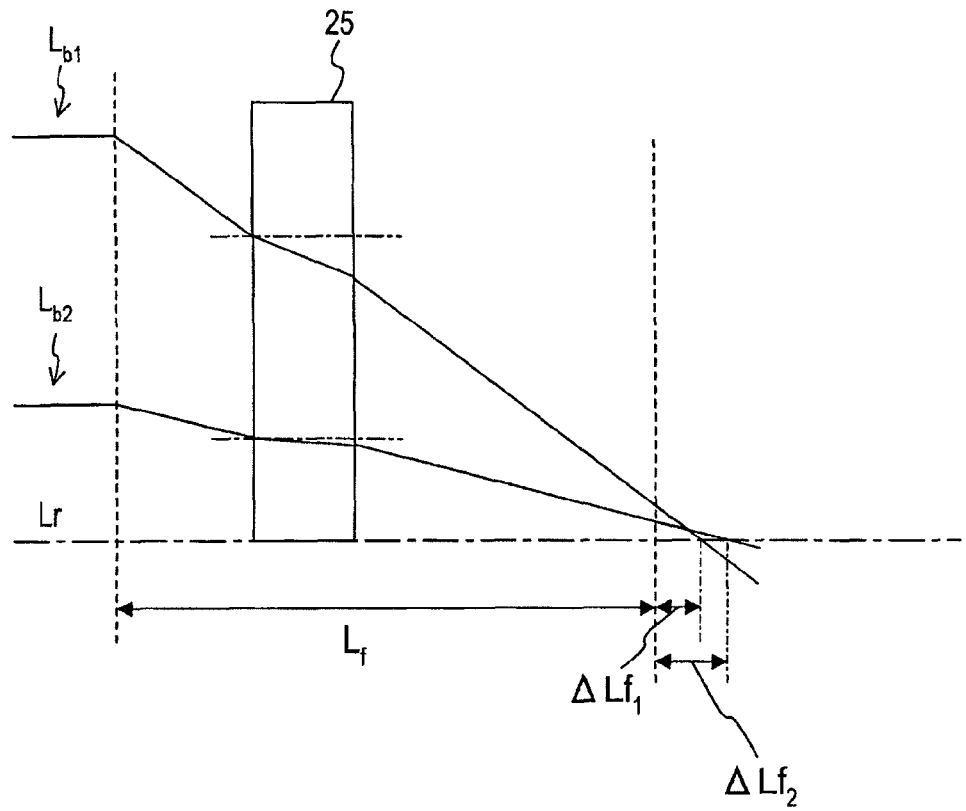
FIG. 5 is a diagram for explaining schematically how to determine a thickness of the second optical member.

In addition, the extended distance $\Delta Lf$ changes depending on multiple respective different light rays or light paths coming from a subject object (object point), which has a predetermined size in a predetermined distance from the image capturing apparatus 10. With reference to FIG. 5, $\Delta Lf1$ is an extended distance of the light ray Lb1 that enters the first optical member 22 at a higher position separated farther from the optical axis Lr, $\Delta Lf2$ ($\Delta Lf2 > \Delta Lf1$) is an extended distance of the light ray Lb2 that enters the first optical member 22 at a lower position separated closer to the optical axis Lr. This produces a difference $\Delta P$ based on the different light rays or paths at the image formation plane on the image sensor 40 or light reception elements 42.

When the difference $\Delta P$ exceeds the size Pmax of one light reception element 42, the formed image of the same point of the same second object is unclear or blurring (i.e., bokeh) in the captured image or picture. Therefore, the lens thickness g of the second optical member 25 is specified to permit the difference $\Delta P$ produced on an image formation plane orthogonal to the optical axis Lr to be within the size Pmax of a single light reception element 42.

Furthermore, the second optical member 25 is provided with a well-known optical polish treatment. Such optical polish treatment is to reduce dispersion of light or local refraction due to the surface of the second optical member 25, and to polish such that the concavo-convex on the surface of the second optical member 25 becomes below a specified value.

It is noted that the image sensor 40 captures the real image of the first object and the real image of the second object to be contained in a single picture (picture frame).

<Light Reduction Member>

The light reduction member 30 is a member which undergone a reduction process which reduces transmission of light; the member 30 includes a short distance light shielding portion 32, a long distance light shielding portion 34, and a reflection reduction portion 36. The light reduction member 30 in the present embodiment is provided to be an integrated member containing the short distance light shielding portion 32, the long distance light shielding portion 34, and the reflection reduction portion 36.

The short distance light shielding portion 32 is a rectangle member having undergone a light shielding treatment, and is located in between the first optical member 22 and the image sensor 40. The short distance light shielding portion 32 faces the first optical member 22 so as to interfere with the light coming from an object point which exists around the optical axis Lr; the portion 32 is attached to the second optical member 25 so as to cover the area around the optical axis Lr on the surface of the second optical member 25. To be specific, the short distance light shielding portion 32 is attached to the second optical member 25 such that (i) one end of the short distance light shielding portion 32 coincides with the bottom side of the second optical member 25 which intersects orthogonally with the optical axis Lr, and (ii) the other end of the short distance light shielding portion 32 is provided as being extended towards the direction which separates from the optical axis Lr.

The long distance light shielding portion 34 is a rectangular member that undergone a light shielding treatment, and is located in between the image sensor 40 and the first optical member 22 so as to interfere with the light coming from an object point existing around the optical axis Lr. The long distance light shielding portion 34 is provided such that (i) one end of the long distance light shielding portion 34 coincides with the one end of the short distance light shielding portion 32, and (ii) the other end of the long distance light shielding portion 34 is provided as being extended in the direction, which separates from the optical axis Lr and is opposite to the second optical member 25.

In other words, the short distance light shielding portion 32 and the long distance light shielding portion 34 may be provided to reduce an intensity of a border light that enters the image sensor 40. The border light includes a long distance border light and a short distance border light. The long distance border light includes first long distance light rays that come from the second object, pass through the first optical member 22, and enter the image sensor 40 without passing through the second optical member 25. The first long distance light rays are adjacent to second long distance light rays that come from the second object, pass through the first optical member 22 and the second optical member 25, and enter the image sensor 40. The short distance border light includes first short distance light rays that come from the first object, pass through the first optical member 22 and the second optical member 24, and enter the image sensor 40. The first short distance light rays are adjacent to second short distance light rays that come from the first object, pass through the first optical member 22, and enter the image sensor 40, without passing through the second optical member 25.

The reflection reduction portion 36 is a member having undergone a light shielding treatment, and is disposed to cover the bottom face of the second optical member 25 along the optical axis Lr. The light shielding treatment applied to (i) the short distance light shielding portion 32, (ii) the long distance light shielding portion 34, and (iii) the reflection reduction portion 36 includes applying paint which absorbs light, covering with a thin film which absorbs light, or forming a plate-like member using material which absorbs light.

<Adjustment Device>

With reference to FIG. 6, the adjustment device 52 is to adjust the position of the second optical member 25 and the light reduction member 30 along the direction which is orthogonal to the optical axis Lr; the adjustment device 52 includes a holding portion 54, a fixing portion 56, and an adjustment knob 58.

The holding portion 54 is a frame body that holds the second optical member 25. The fixing portion 56 is a shaft-like member, one end of which is connected with the holding portion 54 and the other end of which is located at an area outside of the housing 80. The fixing portion 56 has an outer circumference that forms a screw thereon. The housing 80 has a hole through which the fixing portion 56 passes. Furthermore, the hole of the housing 80 is formed to be receiving the screw of the fixing portion 56.

The adjustment knob 58 is a knob connected to one end of the fixing portion 56 outside of the housing 80. That is, in the adjustment device 52, as the adjustment knob 58 is turned, the fixing portion 56 linked with the adjustment knob 58 moves in a straight line along the direction which is orthogonal to the optical axis Lr. Along with the fixing portion 56, the holding portion 54 moves in a straight line along the direction which is orthogonal to the optical axis Lr.

Therefore, when the adjustment knob 58 is turned to permit the holding portion 54 to move in the direction which proceeds to the inside of the housing 80 or the outside of the housing 80, the positions of the second optical member 25 and the light reduction member 30 are adjusted along the direction which is orthogonal to the optical axis Lr.

[Effect of Embodiment]

The light rays, which pass through only the first optical member 22, among a plurality of light rays from the first object (close object) form an image at a first image formation plane (i.e., first image formation point) without being refracted by the second optical member 25. The image sensor 40 is located at the first image formation point. Regarding the light rays from the second object (distant object), the light rays, which pass through only the first optical member 22, form an image at an original image formation plane (i.e., original image formation point) without being refracted by the second optical member 25. The original image formation point is short of the image sensor 40. In contrast, the light rays, which come from the second object and pass through both the first optical member 22 and the second optical member 25, are additionally refracted by the second optical member 25. For instance, a focal point of light rays, which are parallel to the optical axis Lr and enter the first optical member 22, is lengthened by $\Delta Lf$ towards the image sensor 40. Accordingly, among the light rays from the second object, light rays passing through both the first optical member 22 and second optical member 25 form an image at a second image formation plane (i.e., second image formation point), which has been extended towards the image sensor 40 from the original image formation point. That is, providing of the second optical member 25 achieves a state where the position of a foot of perpendicular line from the second image formation point of the second object to the optical axis Lr is permitted to be approximate to the position of a foot of perpendicular line from the first image formation point of the first object to the optical axis Lr. Thereby, (i) the image formed by the light rays coming from the second object and passing through both the first optical member 22 and the second optical member 25, and (ii) the image formed by the light rays coming from the first object and passing through only the first optical member 22 are formed within a permissible bokeh corresponding to a permissible circle of confusion.

Therefore, the image capturing apparatus 10 permits generation of a clear captured image that shows simultaneously a plurality of objects, which exist at different distances from the image capturing apparatus 10, such as a first object (i.e., close object) existing at a first distance (i.e., short distance) and a second object (i.e., distant object) existing at a second distance (i.e., long distance).

In addition, in order to generate such clear captured image showing different objects (object images) having respective different distances, the image capturing apparatus 10 is provided with only a glass plate as the second optical member 25. Unlike the image capturing apparatus described in Patent Literature 1, the first mirror and the secondary mirror are unnecessary. Therefore, according to the present embodiment, the image capturing apparatus 10 may be provided as a smaller size.

In other words, the image capturing apparatus 10 can provide at the same time (i) generation of a captured image or picture which clearly expresses simultaneously several objects having mutually different distances from the image capturing apparatus 10 and (ii) sufficient miniaturization or downsizing of the image capturing apparatus 10 itself. Furthermore, the lens thickness g of the second optical member 25 is specified so as to permit the light (i.e., light rays) coming from one point of the second object to enter one light reception element 42; this helps prevent the captured image of the second object from becoming unclear.

Furthermore, the image capturing apparatus 10 includes the adjustment device 52 to adjust the installation position of the second optical member 25. This permits the generation of much clearer images formed by the light rays coming from the first object and the second object.

Then, the light, which passes through the circumference of the second optical member 25 and enters the image sensor 40, forms an image which is unclear due to the interference of the light. For example, the light, which enters the optical system 20 from around the optical axis Lr, enters the image sensor 40 without being refracted by the first optical member 22 or second optical member 25. The light ray from around the optical axis Lr may contain the light from the first object (that is, short distance light) and the light ray from the second object (that is, long distance light). In such a case, those light rays cause the interference therebetween; thereby, a captured image by a general image capturing apparatus may show that an object image due to the light from the first object and an object image due to the light from the second object are unclear or indistinct.

Figure 7:
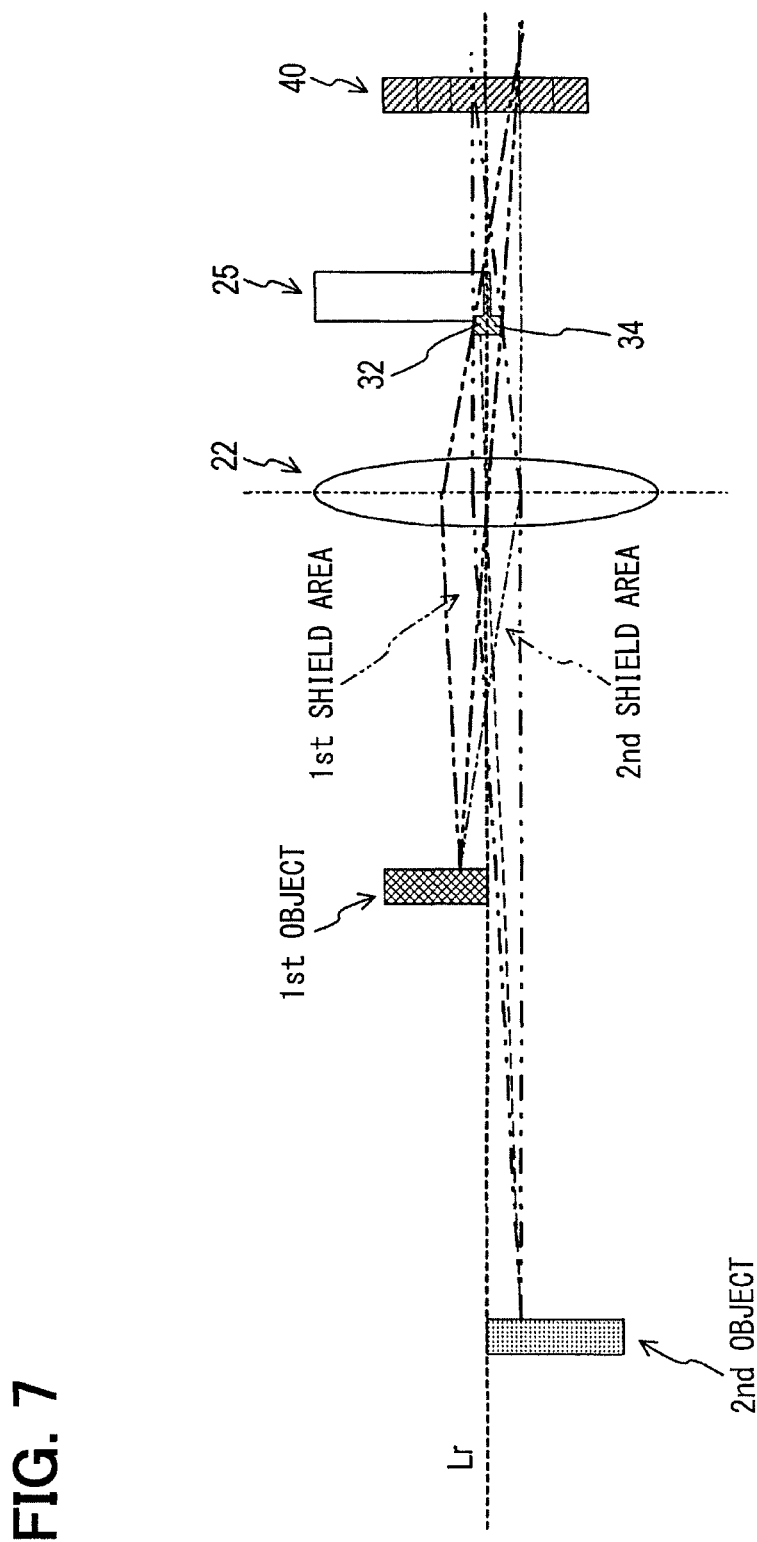
FIG. 7 is a diagram for explaining an operational effect of a light shielding portion.

To that end, for instance, as illustrated in FIG. 7, the short distance light shielding portion 32 and the long distance light shielding portion 34 are provided in the image capturing apparatus 10; this configuration can reduce a light ray, which enters from around the optical axis Lr and passes through the portion around the optical axis Lr of the second optical member 25, among all the light rays entering the image sensor 40. That is, the short distance light shielding portion 32 and the long distance light shielding portion 34 can reduce the light, which passes through the first shielding area and/or the second shielding area in FIG. 7 and then enters the image sensor 40.

Therefore, the image capturing apparatus 10 helps prevent optical-axis-around images from being unclear; the optical-axis-around images are formed by the light rays adjacent to each other (border light) among the light rays from the first object and the light rays from the second object, or by the optical-axis-around light rays that advance around the optical axis Lr, pass through the portion around the optical axis Lr of the second optical member 25, and reach the image sensor 40.

Figure 8:
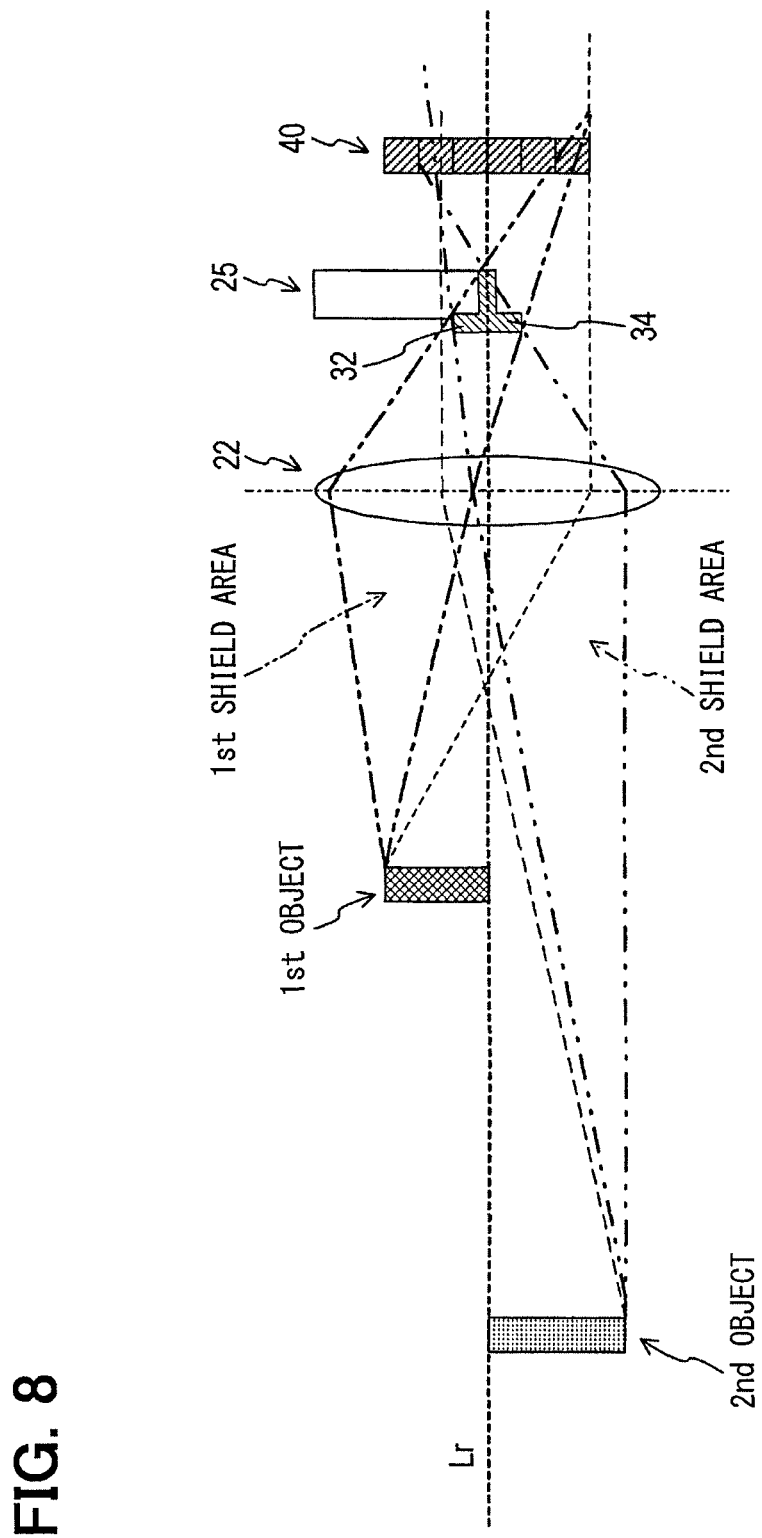
FIG. 8 is a diagram for explaining an operational effect of a light shielding portion.

Further, for instance, with reference to FIG. 8, the short distance light shielding portion 32 and the long distance light shielding portion 34 are provided in the image capturing apparatus 10; this configuration can reduce a light ray, which passes through the portion around the optical axis Lr of the second optical member 25 regardless of the positions of the objects emitting the light ray. That is, the short distance light shielding portion 32 and the long distance light shielding portion 34 can reduce a light ray, which passes through the first shielding area and/or the second shielding area in FIG. 8 and then enters the image sensor 40.

Therefore, the image capturing apparatus 10 can suppress an image, which is formed by the light rays including a light ray passing through around the optical axis Lr in the second optical member 25, from becoming indistinct. Furthermore, the image capturing apparatus 10 is provided with the reflection reduction portion 36 so as to cover the bottom of the second optical member 25; this can suppress the light reflected on the bottom from entering the image sensor 40. As a result, the image capturing apparatus 10 can suppress a ghost image from appearing in the captured image; the ghost image is an image of an object which does not exist actually.

As explained above, the driving support control system 1 including the image capturing apparatus 10 can recognize the surrounding state of the host vehicle V based on the captured image by the image capturing apparatus 10 to thereby enhance the recognition accuracy. As a result, the driving support control system 1 enables the host vehicle V to run more safely.

Other Embodiments

Up to this point, description has been given to an embodiment of the present disclosure. However, the present disclosure is not limited to the above embodiment, and it can be variously embodied as long as not departing from the subject matter of the present disclosure.

For example, the shape of the second optical member 25 is explained as being semicircular in the above embodiment. There is no need to be limited thereto. That is, the shape of the second optical member 25 may be polygonal, such as rectangular, hexagonal, or circular.

In the cases that the shape of the second optical member 25 is polygonal, the second optical member 25 may be desirably arranged such that the bottom side of the second optical member 25 intersects orthogonally with the optical axis Lr of the first optical member 22.

In the cases that the shape of the second optical member 25 is circular, the second optical member 25 may be desirably formed as having a diameter smaller than that of the first optical member 22 and be located coaxial with the optical axis of the first optical member 22.

Furthermore, the second optical member 25 in the above embodiment is made of glass. There is no need to be limited thereto. For instance, as long as the material of the second optical member 25 permits the transmission of light and has an attenuation ratio smaller than a predetermined value, it may be acrylic resin or another material used for optical elements such as lens.

In addition, the second optical member 25 is arranged in between the first optical member 22 and the image-side focal point f2 of the first optical member 22. The second optical member 25 may be arranged differently. For example, the second optical member 25 may be arranged in between the first optical member 22 and the image formation point at which the real image is formed by the light from the first object.

Further, the light reduction member 30 of the above embodiment includes the short distance light shielding portion 32, the long distance light shielding portion 34, and the reflection reduction portion 36. There is no need to be limited thereto. For example, the light reduction member 30 may include at least one of the short distance light shielding portion 32, the long distance light shielding portion 34, and the reflection reduction portion 36. That is, the light reduction member 30 may omit any one of the short distance light shielding portion 32, the long distance light shielding portion 34, and the reflection reduction portion 36. Alternatively, two of the short distance light shielding portion 32, the long distance light shielding portion 34, and the reflection reduction portion 36 may be omitted.

In addition, the light reduction member 30 undergone the light shielding treatment in the above embodiment. There is no need to be limited thereto. Any known treatment or technology may be adopted which suppresses the transmission of light.

Furthermore, the light reduction member 30 itself may be omitted in the present disclosure. Furthermore, the image capturing apparatus 10 according to the present disclosure is applied to the driving support control system 1 in the above embodiment. There is no need to be limited thereto. For example, the image capturing apparatus 10 may be applied to an inspection system which inspects the quality of products in an inspection process of a production line or be applied as a well-known digital camera.

In the inspection system, a product may be supposed to have a step with a predetermined level; one face of the step may be regarded as a first object whereas the other face may be regarded as a second object. A captured image may show the first object and the second object for inspecting whether the product is normal or abnormal. That is, the image capturing apparatus 10 may be used for a machine vision.

In the digital camera, the image capturing apparatus 10 may be used for photographing a picture that expresses clearly several photographic subjects that exist at respective different distances.

While an aspect of the disclosure described herein is already recited in the preceding summary, further optional aspects thereto may be set out as follows.

For instance, as an optional aspect of the disclosure, the second optical member may be a glass plate.

Such a configuration of providing only a glass plate permits the generation of the clear images of different objects having different distances from the image capturing apparatus and the sufficient miniaturization.

Further, as an optional aspect, the second optical member may have a specified thickness along the optical axis to permit a plurality of light rays, which come from the second object and pass through the first optical member and the second optical, to enter within a single light reception element of the image sensor.

Such a configuration of specifying a thickness of the second optical member along the optical axis permits the second on-axis position of the second object (distant object) to be approximate to the first on-axis position of the first object (close object).

Further, a plurality of light rays, which come from the second object and pass through the first optical member and the second optical, are permitted to enter within a single light reception element of the image sensor; this helps prevent an image of the second image (distant object) from being unclear.

Further, as an optional aspect, the second optical member may have an outer face to which optical polish is applied.

Such optical polish applied to the second optical member enables generation of a clear image of the second object.

Further, as an optional aspect, a first adjustment device may be further included to adjust a position of the second optical member in a direction which is orthogonal to the optical axis.

Such a configuration enables adjustment of the installed position of the second optical member and the generation of much clearer image formed by the light coming from each of the first object and the second object.

Further, a border light may be defined as light entering the image sensor; the border light may include a long distance border light and a short distance border light. The long distance border light includes first long distance light rays. The first long distance light rays come from the second object, pass through the first optical member, and enter the image sensor without passing through the second optical member. The first long distance light rays are adjacent to second long distance light rays, which come from the second object, pass through the first optical member and the second optical member, and enter the image sensor. The short distance border light includes first short distance light rays. The first short distance light rays come from the first object, pass through the first optical member and the second optical member, and enter the image sensor. The first short distance light rays are adjacent to second short distance light rays, which come from the first object, pass through the first optical member, and enter the image sensor, without passing through the second optical member.

In general, the light rays of the border light pose interference therebetween, to cause the images generated by the image capturing apparatus to be unclear (i.e., blurred or of bokeh).

To that end, according to an optical aspect, a light reduction member may be further included to reduce an intensity of the border light that enters the image sensor.

Such a configuration of further providing a light reduction member helps prevent the image generated by the light including the border light from being unclear.

Further, as an optional aspect, the light reduction member may be configured as a light shielding portion to shield the image sensor from the border light.

Thereby, the image contained in the image can be more certainly prevented from becoming indistinct.

Incidentally, the bottom face of the second optical member may have a thickness along the optical axis; the thickness may be greater than a predetermined value. In such a case, the bottom reflects light and may thereby generate a ghost image, which is not existing actually, in a captured image.

To that end, as an optional aspect, a reflection reduction portion may be further included to reduce reflection of light in the bottom face of the second optical member.

Such a configuration suppresses the generation of a ghost image, which is not existing actually, in a captured image.

Further, as an optional aspect, the image capturing apparatus may be mounted in a vehicle compartment of an automobile. In this configuration, the picture generated by the image sensor may indicate (i) an object, which is attached to an outer face of a windshield of the vehicle, as the first object, and (ii) an object, which is over a road the vehicle heads, as the second object.

This configuration enables the image capturing apparatus to constitute a driving support control system that is mounted and used in a vehicle.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An image capturing apparatus comprising:
   a first optical member having a predetermined first focal point distance that is a distance to an image-side focal point in an image side, wherein light rays, which come from an object side in parallel to an optical axis, converge at the image-side focal point in the image side, the first optical member separating along the optical axis from a first object and a second object in the object side by a first distance and a second distance, respectively, the second distance being longer than the first distance;
   an image sensor disposed at a first image formation point where an image is formed by light rays coming from the first object and passing through the first optical member, the image sensor being along a plane orthogonal to the optical axis, the image sensor including a plurality of light reception elements in array along the plane, each light reception element outputting a reception signal proportional to an intensity of a received light, the image sensor generating a picture based on the reception signals;
   a second optical member having a refractive index higher than a refractive index of air, the second optical member being disposed in between the first optical member and the image sensor to refract light rays coming from the second object and passing through the first optical member, the second optical member permitting a second on-axis position to be approximate to a first on-axis position, the second on-axis position being a foot of perpendicular line to the optical axis from a second image formation point where an image is formed by light rays coming from the second object and passing through the first optical member and the second optical member, the first on-axis position being a foot of perpendicular line to the optical axis from the first image formation point; and
   a light reduction member to reduce an intensity of a border light that enters the image sensor,
   the border light including a long distance border light and a short distance border light,
   the long distance border light being first long distance light rays that come from the second object, pass through the first optical member, and enter the image sensor without passing through the second optical member,
   the first long distance light rays being adjacent to second long distance light rays that come from the second object, pass through the first optical member and the second optical member, and enter the image sensor,
   the short distance border light being first short distance light rays that come from the first object, pass through the first optical member and the second optical member, and enter the image sensor,
   the first short distance light rays being adjacent to second short distance light rays that come from the first object, pass through the first optical member, and enter the image sensor, without passing through the second optical member.

2. The image capturing apparatus according to claim 1, wherein
   the second optical member is a glass plate.

3. The image capturing apparatus according to claim 2, wherein
   the second optical member has a specified thickness to permit a plurality of light rays, which come from the second object and pass through the first optical member and the second optical, to enter within a single light reception element of the image sensor.

4. The image capturing apparatus according to claim 2, wherein
   the second optical member has an outer face to which optical polish is applied.

5. The image capturing apparatus according to claim 1, wherein
   the light reduction member includes a light shielding portion to shield the image sensor from the border light.

6. The image capturing apparatus according to claim 5, wherein:
   the light shielding portion includes a member to which a light shielding treatment is applied; and
   the light shielding portion is disposed to face the first optical member by covering a portion of the second optical member, to shield the portion of the second optical member from the short distance border light.

7. The image capturing apparatus according to claim 5, wherein:
the light shielding portion includes a member to which a light shielding treatment is applied; and
the light shielding portion is disposed in between the first optical member and the image sensor, to shield the image sensor from the long distance border light.

8. The image capturing apparatus according to claim 5, further comprising:
a second adjustment device to adjust an installation position of the light shielding portion in a direction which is orthogonal to the optical axis of the first optical member.

9. The image capturing apparatus according to claim 1, further comprising:
a reflection reduction portion to reduce reflection of a light in a bottom face of the second optical member, the bottom face of the second optical member being formed as a member with a thickness along the optical axis, the thickness being greater than a predetermined value.

10. The image capturing apparatus according to claim 9, wherein
the reflection reduction portion includes a member to which a light shielding treatment is applied.

11. The image capturing apparatus according to claim 1, being mounted to an occupant compartment of a vehicle, wherein the picture generated by the image sensor indicates
(i) an object, which is attached to an outer face of a windshield of the vehicle, as the first object, and
(ii) an object, which is over a road the vehicle heads, as the second object.

12. The image capturing apparatus according to claim 11, wherein:
the second optical member includes a member shaped of a polygon, which is orthogonal to the optical axis; and
the second optical member is disposed such that one bottom side of the polygon intersects with the optical axis.

13. The image capturing apparatus according to claim 11, wherein:
the second optical member includes a member shaped of a circle, which is orthogonal to the optical axis; and
the second optical member is disposed such that a center of the circle coincides with the optical axis.

14. An image capturing apparatus comprising:
a first optical member having a predetermined first focal point distance that is a distance to an image-side focal point in an image side, wherein light rays, which come from an object side in parallel to an optical axis, converge at the image-side focal point in the image side, the first optical member separating along the optical axis from a first object and a second object in the object side by a first distance and a second distance, respectively, the second distance being longer than the first distance;
an image sensor disposed at a first image formation point where an image is formed by light rays coming from the first object and passing through the first optical member, the image sensor being along a plane orthogonal to the optical axis, the image sensor including a plurality of light reception elements in array along the plane, each light reception element outputting a reception signal proportional to an intensity of a received light, the image sensor generating a picture based on the reception signals;
a second optical member having a refractive index higher than a refractive index of air, the second optical member being disposed in between the first optical member and the image sensor to refract light rays coming from the second object and passing through the first optical member, the second optical member permitting a second on-axis position to be approximate to a first on-axis position, the second on-axis position being a foot of perpendicular line to the optical axis from a second image formation point where an image is formed by light rays coming from the second object and passing through the first optical member and the second optical member, the first on-axis position being a foot of perpendicular line to the optical axis from the first image formation point; and
a first adjustment device to adjust a position of the second optical member in a direction which is orthogonal to the optical axis.

15. The image capturing apparatus according to claim 14, wherein
the second optical member is a glass plate.

16. The image capturing apparatus according to claim 15, wherein
the second optical member has a specified thickness to permit a plurality of light rays, which come from the second object and pass through the first optical member and the second optical, to enter within a single light reception element of the image sensor.

17. The image capturing apparatus according to claim 15, wherein
the second optical member has an outer face to which optical polish is applied.

18. The image capturing apparatus according to claim 14, being mounted to an occupant compartment of a vehicle, wherein the picture generated by the image sensor indicates
(i) an object, which is attached to an outer face of a windshield of the vehicle, as the first object, and
(ii) an object, which is over a road the vehicle heads, as the second object.

19. The image capturing apparatus according to claim 18, wherein:
the second optical member includes a member shaped of a polygon, which is orthogonal to the optical axis; and
the second optical member is disposed such that one bottom side of the polygon intersects with the optical axis.

20. The image capturing apparatus according to claim 18, wherein:
the second optical member includes a member shaped of a circle, which is orthogonal to the optical axis; and
the second optical member is disposed such that a center of the circle coincides with the optical axis.

* * * * *